Figure 1:
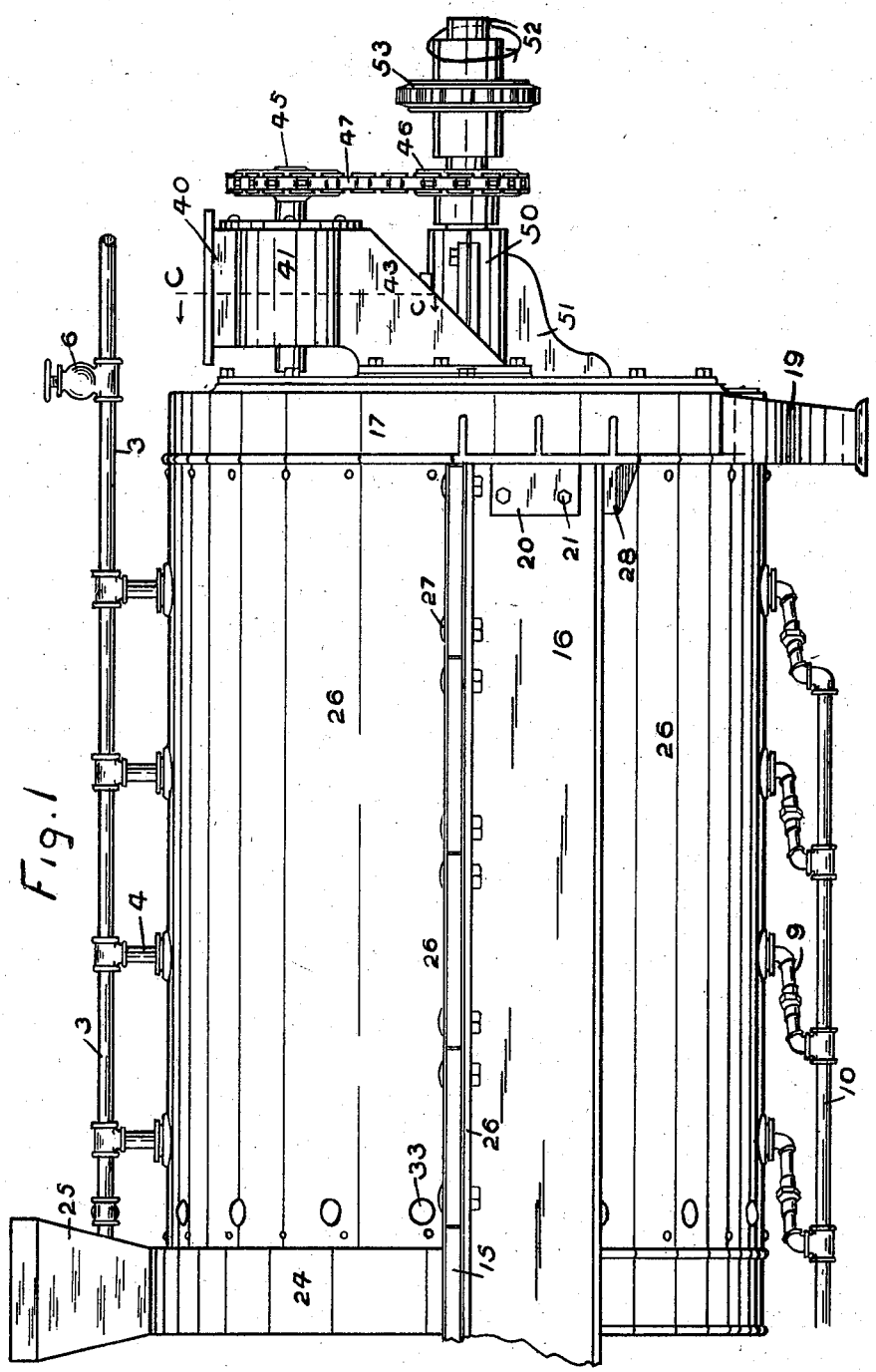

No. 702,127. Patented June 10, 1902.
J. P. CHURCHILL.
GRAIN DRIER.
(Application filed July 31, 1901.)

(No Model.) 4 Sheets—Sheet 1.

WITNESSES:
W. L. Greene
F. E. Bryant

INVENTOR.
John P. Churchill
BY V. H. Lockwood
ATTORNEY.

No. 702,127. Patented June 10, 1902.
J. P. CHURCHILL.
GRAIN DRIER.
(Application filed July 31, 1901.)
(No Model.) 4 Sheets—Sheet 2.

WITNESSES:
W. L. Greene
T. E. Bryant

INVENTOR,
John P. Churchill
BY
V. H. Lockwood
ATTORNEY.

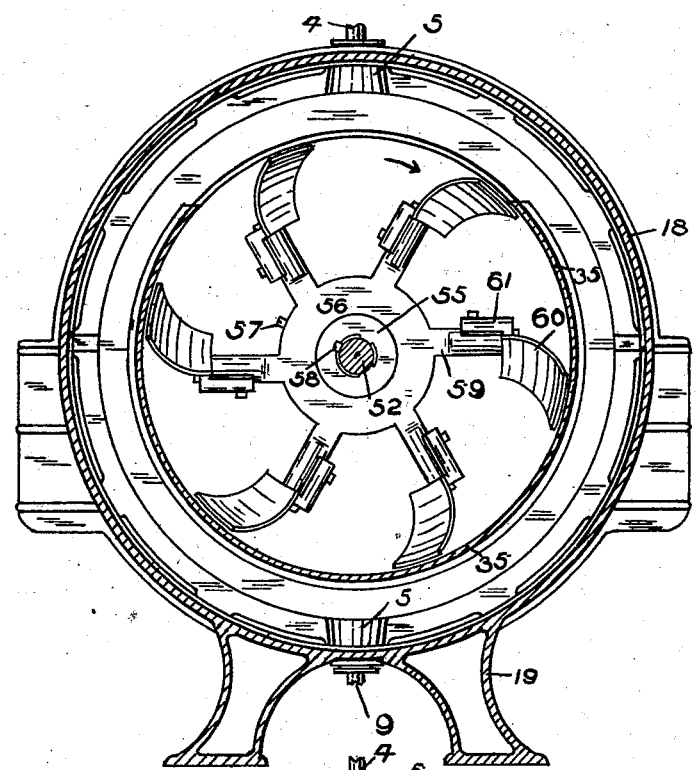
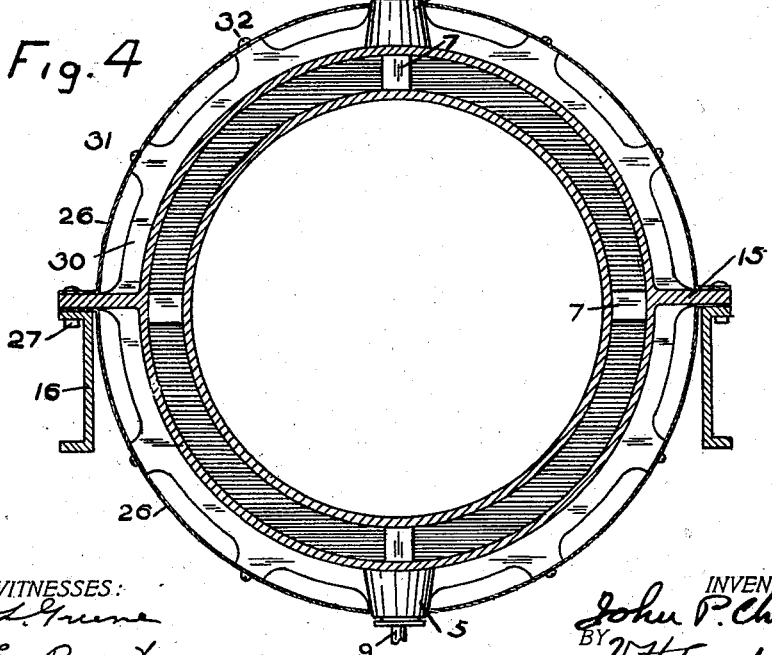

No. 702,127. Patented June 10, 1902.
J. P. CHURCHILL.
GRAIN DRIER.
(Application filed July 31, 1901.)
(No Model.) 4 Sheets—Sheet 4.
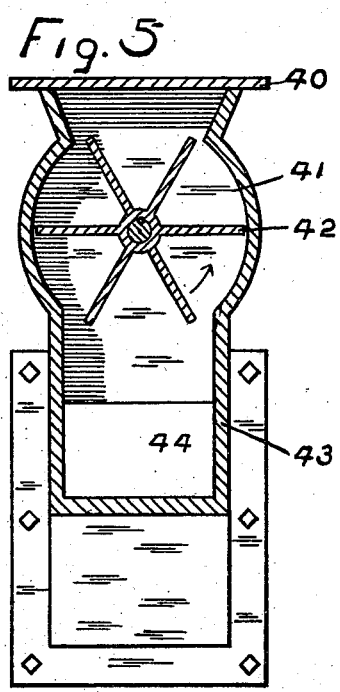
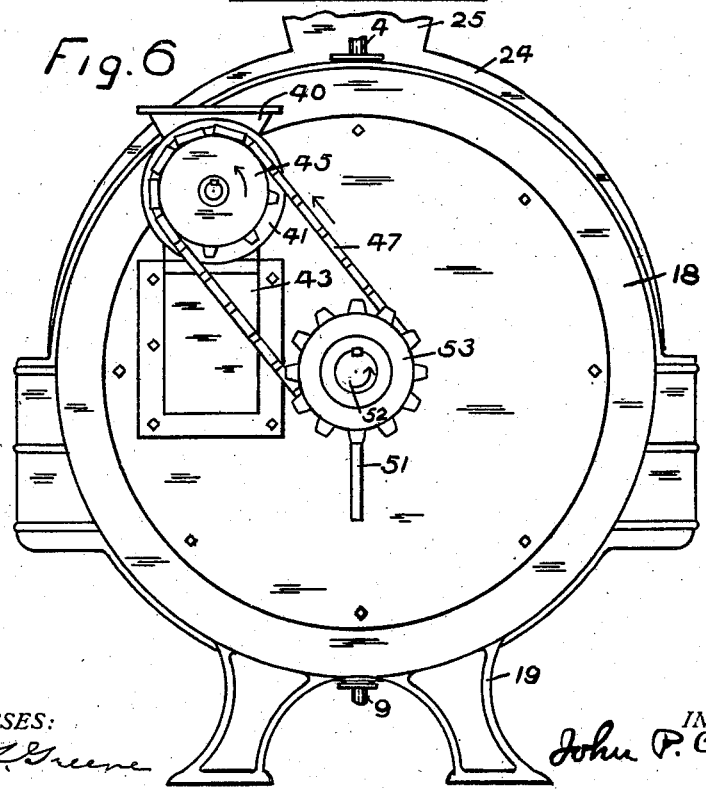
WITNESSES: INVENTOR.
John P. Churchill
BY V. H. Lockwood
ATTORNEY.

UNITED STATES PATENT OFFICE.

JOHN P. CHURCHILL, OF INDIANAPOLIS, INDIANA.

GRAIN-DRIER.

SPECIFICATION forming part of Letters Patent No. 702,127, dated June 10, 1902.

Application filed July 31, 1901. Serial No. 70,404. (No model.)

*To all whom it may concern:*

Be it known that I, JOHN P. CHURCHILL, of Indianapolis, county of Marion, and State of Indiana, have invented a certain new and useful Grain-Drier; and I do hereby declare that the following is a full, clear, and exact description thereof, reference being had to the accompanying drawings, in which like numerals refer to like parts.

The object of this invention is to provide a machine for drying meal, cereals, and the like rapidly and thoroughly and to improve the constructional features of grain-driers.

The features of the invention consist, mainly, in making the drier of sections which are secured side by side in building up the machine. The sections contain cylindrical steam-chambers with inlets at the upper end and outlets at the lower end, whereby a sufficient heat is transmitted and there is perfect drainage, as the condensation-water cannot fill the whole steam-chamber, so that the hammering of the condensation-water is prevented. These sections containing annular steam-chambers, therefore, are independent and have independent inlets and outlets. An air-heating chamber is formed around the steam-chamber, whereby the air therein is heated and dried by the steam-chamber, and it enters the drying-chamber that contains material to be dried at each end and is withdrawn at the middle. The feeding apparatus and outlet apparatus are both so made as to be practically air-tight in order to permit the air-currents to be treated and conducted within the machine in the manner described. The cold air can therefore come only through the openings in the outer shell near the middle of the machine, and in passing longitudinally in either direction through the outer air-heating chambers the air becomes heated by contact with the steam cylinder or castings before it enters the central drying-chamber of the machine at the ends. When it does enter the ends of the drying-chamber, it is drawn, together with the moisture that it takes up from the grain, rapidly toward the suction-chamber or outlet at the middle. Upon entering the machine the materials to be dried therefore come directly in contact with the inner heated surface of the steam cylinder or castings, and this draws the moisture from the grain to the surface, and after the grain is thus treated it is carried up by the agitators into contact with the current of hot dry air that is constantly moving along the upper part of the drying-chamber from the ends to the middle, whereby the moisture is absorbed and carried away. The material returns again to the bottom of the drying-chamber, where it is again subjected to heat and again dried as it is carried upward and around by the agitators.

The operation of the machine subjects the material alternately to first a strong heat and then a mild circulation of hot dry air, when the material is in the best condition to impart the moisture and the air is in the best condition to absorb it.

The various features of the invention will more fully appear in the accompanying drawings and the following description and claims.

Figure 2:
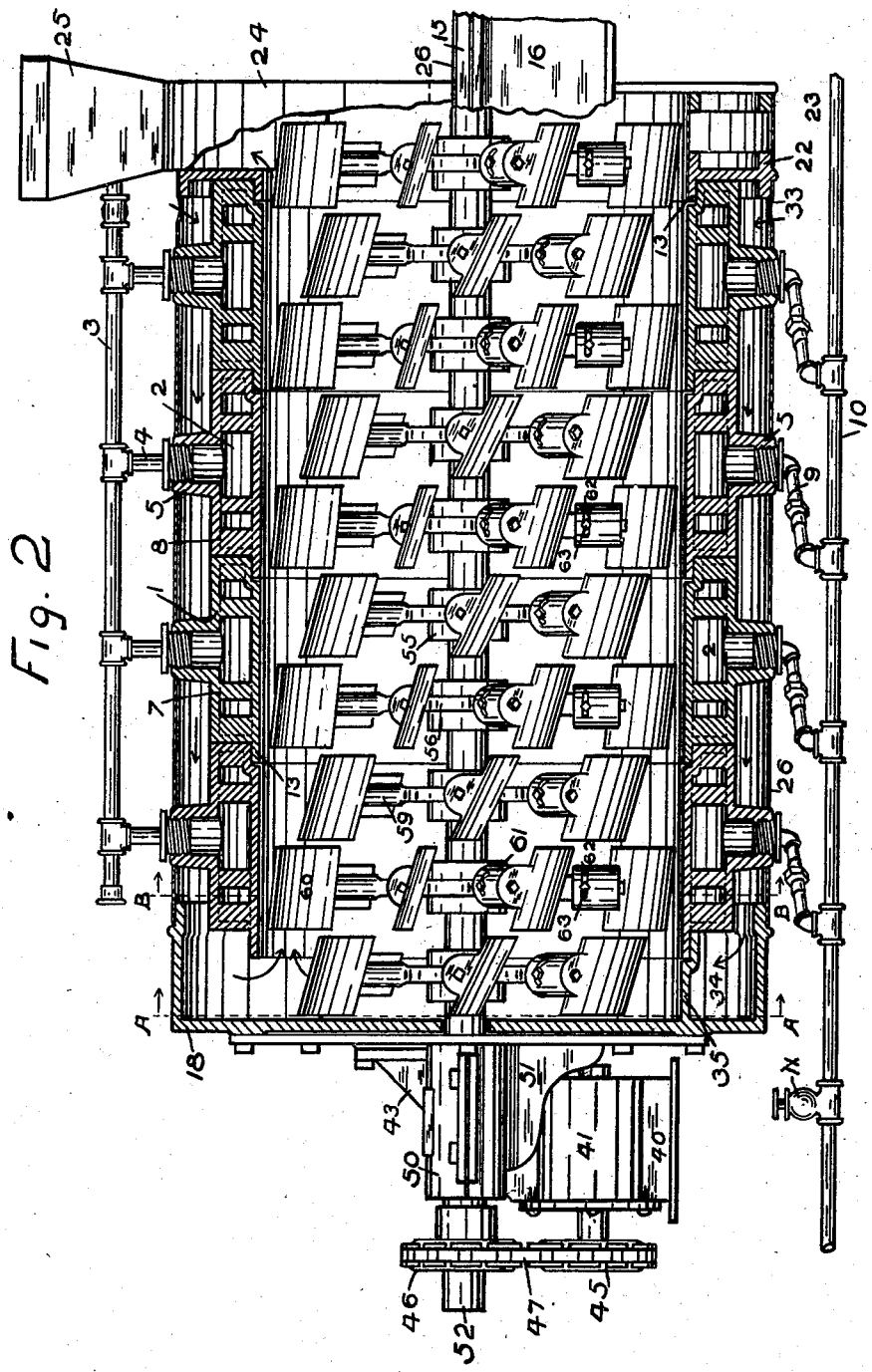

In the drawings, Figure 1 is a side elevation of the right half of the machine. Fig. 2 is a central vertical section of the left half of the machine. Fig. 3 is a vertical cross-section through the machine on the line A A of Fig. 2. Fig. 4 is a cross-section on the line B B of Fig. 2. Fig. 5 is a cross-section of the feeding device on the line C C of Fig. 1. Fig. 6 is an elevation of the right-hand end of the machine as shown in Fig. 1.

Referring now the details of the machine shown in the drawings, the main steam-cylinder is made up of a number of cylindrical castings 1, each of which is hollow to form the annular steam-chamber 2, into which steam enters from the supply-pipe 3 through the individual pipes 4, leading therefrom and entering the boss 5. The steam-supply pipe 3 is regulated by the valve 6. As stated, the section of the steam cylinder or casting 1 is hollow throughout, but has at various places in it the posts 7 and the extensions 8 from the walls thereof to strengthen or reinforce the inner and outer walls of the castings. At the lower end from the boss 5 the outlet-pipe 9 leads to the drain-pipe 10. In this way the steam and condensation-water are drained from the steam-chamber 2, and the hammering of the steam in such chamber is practically prevented because of the large size of the chamber. A valve 11 controls the pipe 10. The adjacent edges of the sections are made to overlap and join each other, as shown in Fig. 2. Each section has along its left-hand edge an annular flange 13 and along the opposite or right-hand edge a corresponding recess or groove to receive the flange of the adjoining section, whereby the right-hand edge of each casting overlaps the flange 13 on the left-hand edge of the adjacent casting. Each casting 1 also has on each side thereof, near the middle, the laterally-extending flange 15, to be seen best in Fig. 4, whereby the casting is supported by the horizontal channel-bars 16. The channel-bars 16 are held in place by the ends 17 and 18 of the machine. These end pieces or frames are supported on the legs 19, as seen in Fig. 3, and on each side, near the middle, have the extensions 20, to be seen in Fig. 1, to which the bars 16 are secured by the bolts 21. In addition to the end frames 17 and 18 there are middle castings 22, held apart and in place by the sheet-metal strips 23 between them, that extend around and in the upper part is enlarged to form the suction-chamber 24, leading to the outlet 25, near the middle of the machine, through which the air is removed after it has been drawn through the drying-cylinder. The inner castings 1 on the two sides surround the flange 13 of the castings 22 and hold them in place.

An outer casing is formed of a lower semi-cylindrical piece of sheet metal 26, that extends between the casting 22, near the middle of the machine, and a bead on the end frames 17 and 18, as shown, and its lateral edges are turned horizontally, so as to rest directly upon the channel-bars 16, as seen in Fig. 4. Upon this sheet metal the flanges 15 from the main steam-chamber castings rest directly. Upon the flanges 15 the laterally-turned side edges of the upper semicylindrical part of the casing 26 are placed, and these parts are bolted together by a number of bolts 27, as appears in Figs. 4 and 1. This holds the parts of the machine together. The channel-bars 16 at each end are also partially supported by the brackets 28, one of which appears in Fig. 1.

As is seen in Figs. 2, 3, and 4, there is an air-heating chamber between the steam-heating castings and the outer casing that is continuous from a point near the middle of the machine to each end. Each of the steam-heating castings has centrally and annularly about it a rib 30, with extensions 31 at intervals therefrom, to which the casing is secured by the screw 32. Air is supplied to this air-chamber surrounding the steam-chambers through a series of openings 33 in the outer casing near the middle, as seen in Figs. 1 and 2. The air entering through those openings turns and passes toward the nearest end of the machine, as shown by arrows, into the end chamber 34 in the end frames 17 and 18 and becomes heated by the time it reaches that chamber. The chamber 34 in the end frames is annularly formed by the outer wall of the end frames and the inner partitional wall 35, which extends only about three-fourths of the distance around the end frames, leaving an opening on the upper side extending about one-fourth the distance around the end frame. The air therefore entering the annular chamber 34 passes up on each side to the upper part of the chamber formed by the end frames and then turns into the central or drying chamber of the machine. This arrangement is provided because the grain fills the lower half or more of the central or drying chamber and the air is introduced only to that portion of said chamber that is above the grain. This air when it enters the drying-chamber has become heated, and as it passes toward the middle of the machine the grain is carried by the agitators through the current of hot dry air. The air is drawn through and out of the machine by an exhaust-fan apparatus, which is not shown, but which is attached to the outlet-hood 25.

The material is fed into the machine by the means shown at the right-hand end of Fig. 1 and also in Figs. 5 and 6, it being placed above and to one side of the center and consisting of a hopper 40, as shown in Fig. 5, leading to the cylindrical chamber 41, in which a reel 42 operates, with the wings thereof coming into close contact with the walls of the chamber to prevent the entrance of cold air to the interior of the machine. From the chamber 41 the grain is discharged by the reel into the chute 43, that leads to the opening 44 in the end frame 17. The reel 42 is driven by the sprocket-wheels 45 and 46 and the chain 47. At the discharge end, as seen in Fig. 2, the same device is provided for the outlet, except that it is inverted.

On the end frames of the machine suitable bearings 50 are supported by the bracket 51, in which the shaft 52 is mounted. This shaft extends through the cylinder of the machine and is driven by the sprocket-wheel 53. It carries the agitators for stirring the grain, as appears in Figs. 2 and 3. The agitators are formed of what may be called a "hub" 55, with a centrally-extending annular rib 56 integral therewith and secured upon the shaft by the set-screw 57, extending through the parts 55 and 56 and acting against the key 58. The casting formed of the parts 55 and 56 has also integral with it radiating arms 59, whose outer ends are circular and upon which the agitators 60 are secured by means of the semicircular shanks 61, having a horizontal slot 62, (seen in Fig. 2,) through which the set-screw 63 extends, said set-screw screwing into the arms 59 and clamping the part 61 to the part 59. This arrangement permits of the rotary adjustment of the agitators, so as to turn them at a slight angle with the axis of the machine in order to determine the speed of the material through the machine. In Fig. 2 all of the agitators 60 are adjusted at a slight angle. The agitators are also curved in a forwardly direction somewhat, as shown in Fig. 3, so as to carry the grain to a large extent up over the center for presenting it to the action of the current of hot dry air that is moving through the upper part of the drying-chamber.

What I claim as my invention, and desire to secure by Letters Patent, is—

1. In a grain-drier, a drying-cylinder formed of cylindrical sections having an outside and an inside wall with a chamber between them, and means for securing said sections adjacent to each other to form the cylinder.

2. In a grain-drier, a drying-cylinder formed of cylindrical sections with an independent annular steam-chamber in each section, and means for securing said sections adjacent each other to form the cylinder.

3. In a grain-drier, a drying-cylinder formed of cylindrical sections with an independent annular steam-chamber in each section, means for introducing steam into the upper portion of each steam-chamber, and means leading from the lower portion of each chamber for draining the same.

4. In a grain-drier, a drying-cylinder formed of cylindrical sections with an independent annular steam-chamber in each section, a valve-controlled steam-pipe, pipes therefrom to supply the steam-chamber in each section, a valve-controlled drainage-pipe, and a pipe leading thereto from the lower portion of each of said steam-chambers.

5. In a grain-drier, a drying-cylinder composed of a number of sections, a supporting-flange on each side of each section, a pair of horizontal bars, and means for securing the flanges of said sections to the bars, whereby the sections will be supported between the bars tightly against each other to form a cylinder.

6. In a grain-drier, a drying-cylinder formed of sections with an annular steam-chamber in each section, the edge of one section overlapping a portion of the edge of the adjacent section, and means for securing them together in such position, whereby a closed drying-cylinder is formed.

7. In a grain-drier, a heating-cylinder formed of sections, an annular steam-chamber in each section and having outward extensions from its periphery, a casing surrounding said sections, means for securing said casing to the extensions from the sections of the heating-cylinder, openings in the casing at one end for the admission of air between the casing and the cylinder, and a passage-way from the space between said casing and cylinder to the interior of the cylinder.

8. In a grain-drier, a heating-cylinder formed of sections with an annular steam-chamber in each section and said sections having on each side a laterally-extending flange, a pair of bars one on each side of said cylinder, a semicylindrical casing surrounding the underside of the cylinder with its edges turned laterally and resting upon said bars beneath the flanges from the sections of the cylinder, a semicylindrical casing surrounding the upper portion of the cylinder with its edges turned laterally and resting upon the flanges from the sections of the cylinder, and means for securing the edges of the parts of the casing and the flanges of the sections of the cylinder and the supporting-bars together.

9. In a grain-drier, cylindrical end frames mounted on suitable supports, supporting-bars extending between and secured to said end frames, one along each side of the machine, a drying-cylinder formed of sections with a laterally-extending flange on each side, and means for securing the flanges of said sections to the supporting side bars of the machine.

10. In a grain-drier, a drying-chamber surrounded by a steam-heating chamber, an air-heating chamber surrounding the steam-heating chamber, means near the middle of the machine for withdrawing the air from the drying-chamber, and a passage-way at each end of the machine from the air-heating chamber into the drying-chamber.

11. In a grain-drier, agitating means consisting of a shaft with a number of hubs secured thereon with radiating arms having a covex surface, agitator-blades with concave shanks fitting against said rotary arms and transversely slotted, and a bolt extending from said arms through the slotted shank of the agitator-blade, whereby the position of the blade may be adjusted.

In witness whereof I have hereunto affixed my signature in the presence of the witnesses herein named.

JOHN P. CHURCHILL.

Witnesses:
FLORENCE E. BRYANT,
W. L. GREENE.